(12) United States Patent
Mischook et al.

(10) Patent No.: US 10,049,168 B2
(45) Date of Patent: Aug. 14, 2018

(54) SYSTEMS AND METHODS FOR MODIFYING WEBPAGE DATA

(75) Inventors: Richard Mischook, Dungannon (GB); Colin Woods, Dungannon (GB)

(73) Assignee: OPENWAVE MOBILITY, INC., Redwood City, CA (US)

( * ) Notice: Subject to any disclaimer, the term of this patent is extended or adjusted under 35 U.S.C. 154(b) by 492 days.

(21) Appl. No.: 13/363,109

(22) Filed: Jan. 31, 2012

(65) Prior Publication Data

US 2013/0198607 A1 Aug. 1, 2013

(51) Int. Cl.
*G06F 17/21* (2006.01)
*G06F 17/30* (2006.01)
*G06F 17/22* (2006.01)

(52) U.S. Cl.
CPC ............... *G06F 17/30905* (2013.01)

(58) Field of Classification Search
CPC ...................................... G06F 17/211
USPC ......................................... 715/234
See application file for complete search history.

(56) References Cited

U.S. PATENT DOCUMENTS

| | | | | |
|---|---|---|---|---|
| 8,347,083 B1 * | 1/2013 | Scudder | ............. | H04L 63/0435 713/159 |
| 8,522,010 B2 * | 8/2013 | Ozzie et al. | .................. | 713/155 |
| 9,037,963 B1 * | 5/2015 | Chandi | ......................... | 715/234 |
| 2003/0204573 A1 * | 10/2003 | Beck et al. | .................... | 709/218 |
| 2008/0294716 A1 | 11/2008 | Couvreur | | |
| 2009/0037517 A1 | 2/2009 | Frei | | |
| 2009/0089448 A1 * | 4/2009 | Sze | ......................... | G06F 15/16 709/231 |
| 2010/0094755 A1 | 4/2010 | Kloster | | |
| 2010/0180330 A1 | 7/2010 | Zhu et al. | | |
| 2010/0313116 A1 | 12/2010 | Hyman | | |
| 2011/0138429 A1 | 6/2011 | Schade et al. | | |
| 2011/0154130 A1 * | 6/2011 | Helander et al. | ............. | 715/234 |
| 2011/0167474 A1 | 7/2011 | Sinha et al. | | |

(Continued)

FOREIGN PATENT DOCUMENTS

| | | |
|---|---|---|
| WO | 0146873 A1 | 6/2001 |
| WO | 2007062026 A2 | 5/2007 |

(Continued)

OTHER PUBLICATIONS

Alman, "Ben Alman > JQuery Postmessage > Examples > IFrame Resizing", Oct. 30, 2009, https://web.archive.org/web/20091030074305/http://benalman.com/code/projects/jquery-postmessage/examples/iframe.

*Primary Examiner* — James J Debrow
(74) *Attorney, Agent, or Firm* — EIP US LLP

(57) ABSTRACT

Methods, systems, devices and computer program products for modifying and processing host webpage data are described. The host webpage data intended for receipt by a browser which will interpret the host webpage data and generate a host webpage document therefrom. The host webpage data is modified using second and third webpage data before being sent to the browser. The second webpage data is arranged to cause a frame to be generated within the host webpage document, the generated frame comprising a second webpage document which is associated with a different domain to the host webpage document. Furthermore, the third webpage data is arranged to cause the browser to allow access to functionality of the host webpage document by the second webpage document which would otherwise be blocked.

23 Claims, 7 Drawing Sheets

(56) References Cited

U.S. PATENT DOCUMENTS

| | | | |
|---|---|---|---|
| 2011/0225233 A1 | 9/2011 | Casalaina et al. | |
| 2011/0225488 A1 | 9/2011 | Schluter | |
| 2011/0225506 A1 | 9/2011 | Casalaina et al. | |
| 2011/0258535 A1 | 10/2011 | Adler, III et al. | |
| 2011/0274261 A1 | 11/2011 | Casalaina et al. | |
| 2011/0276876 A1 | 11/2011 | Kwan et al. | |
| 2011/0277024 A1 | 11/2011 | Begley et al. | |
| 2011/0289139 A1 | 11/2011 | McIntosh et al. | |
| 2011/0321133 A1 | 12/2011 | Grieve | |
| 2012/0011196 A1 | 1/2012 | Green et al. | |
| 2012/0092730 A1* | 4/2012 | Aoki | 358/1.18 |
| 2012/0150742 A1* | 6/2012 | Poon et al. | 705/44 |
| 2012/0317238 A1* | 12/2012 | Beard | H04L 63/10 709/219 |
| 2013/0054803 A1* | 2/2013 | Shepard et al. | 709/225 |
| 2013/0080887 A1* | 3/2013 | Hou | G06F 9/455 715/273 |
| 2013/0191538 A1* | 7/2013 | Johnson | H04L 41/145 709/225 |
| 2013/0191880 A1* | 7/2013 | Conlan | H04L 63/20 726/1 |
| 2013/0238695 A1* | 9/2013 | Giraud et al. | 709/203 |

FOREIGN PATENT DOCUMENTS

| | | |
|---|---|---|
| WO | 2010127327 A1 | 11/2010 |
| WO | 2010135399 A1 | 11/2010 |
| WO | 2011042360 A1 | 4/2011 |
| WO | 2011050368 A1 | 4/2011 |
| WO | 2011163655 A2 | 12/2011 |

\* cited by examiner

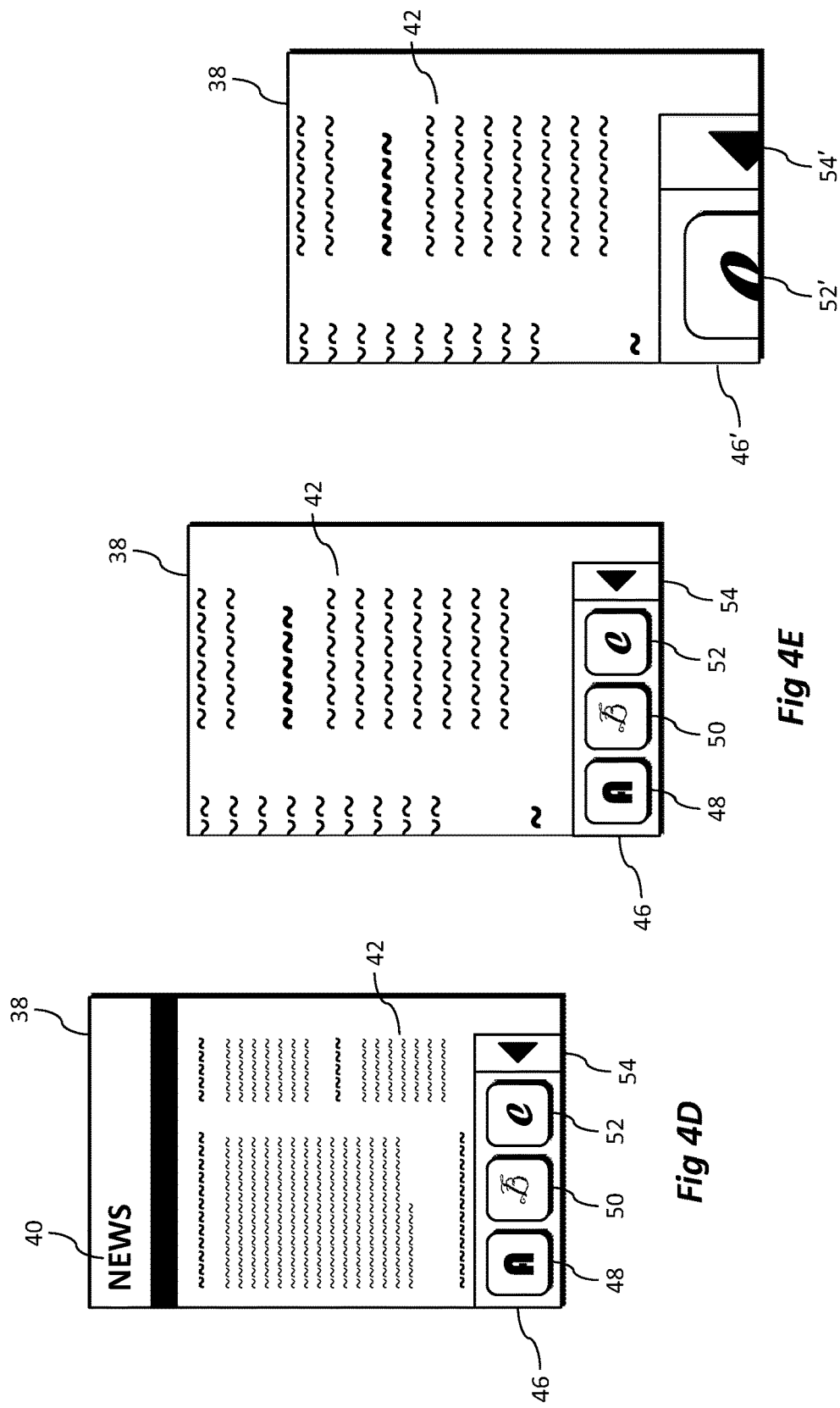

SYSTEMS AND METHODS FOR MODIFYING WEBPAGE DATA

FIELD OF THE INVENTION

The present invention relates to systems and methods for modifying webpage data which is for receipt by a browser.

BACKGROUND

Web browsing is the process by which a user may view multiple (and often linked) webpage documents using a browser, which is typically an application running on a desktop computer, smart TV, laptop, tablet, PDA or smartphone. The user selects desired content, e.g. by entering a search request into the browser, or by clicking on a link within a bookmarks menu or in an existing webpage being displayed by the browser, and in response to the selection, the browser requests a webpage from a content server. To facilitate this process the content server is connected to the browser by a network, such as the internet.

The request identifies webpage data using a Uniform Resource Locator (URL), as described in the Internet standard STD 66 (also RFC 3986). A URL identifies both the content server, so that the request can be properly routed through the network, and the nature of the webpage data which is desired from the particular content server. A URL, such as www.examplecontentserver.com/index.html may be considered to consist of two components, a domain component, "www examplecontentserver.com" and a file identifier component, "index.html".

The content server responds to the request by serving webpage data to the browser. The browser will then use this webpage data to generate a webpage document, which is displayed by the browser. Often, the webpage document is constructed from multiple files, each containing webpage data, and each of which has a particular URL. For instance, a webpage document may be constructed from a marked up text file (for example HTML, XHTML, XML or similar), which itself contains links or references to additional data, such as style sheets (used for formatting the marked up document), scripting instructions (used to make the webpage more interactive), and other media (images, video, and/or audio files). The browser will typically receive the marked up text file first, then parse the marked up text file to identify any linked data, which may be subsequently requested from a content server.

It has recently been proposed to intercept and modify webpage data en route to the browser. This modification may serve many purposes, a simple example being the addition of an advertisement or banner to a webpage. As such, the webpage will display in a similar manner to an unmodified webpage, but the advert or banner will, for example, be included along one side of, or floating over, the webpage document as it is displayed.

It is an object of the present disclosure to present an improved system for modifying webpage data which is for receipt by a browser.

SUMMARY OF THE INVENTION

In accordance with embodiments, methods, devices, systems and software are provided for supporting or implementing functionality to modify and process webpage data.

This is achieved by a combination of features recited in each independent claim. Accordingly, dependent claims prescribe further detailed implementations embodiments.

A first exemplary embodiment provides a computer implemented method of modifying first webpage data on the basis of second webpage data and third webpage data, the first webpage data being for receipt by a browser configured to interpret the first webpage data whereby to generate a first webpage document, the method comprising: receiving, via an interface, the first webpage data; modifying, using a processor, the first webpage data using the second and third webpage data; and sending, via an interface, the modified first webpage data to the browser, wherein, when executed by the browser: the second webpage data causes a frame to be generated within the first webpage document, the generated frame comprising a second webpage document, the second webpage document being associated with a different domain to the first webpage document; and the third webpage data causes the browser to allow access to functionality of the first webpage document by the second webpage document which, without the third webpage data, would otherwise be blocked.

Conventionally, when a browser generates a first webpage document having a frame, and loads a second webpage document into that frame, the browser may block access, by the second webpage document, to functionality (i.e. methods and properties) of the first webpage document. Such blocking is performed in order to, among other reasons, prevent malicious webpage documents exploiting other webpage documents. Such blocking is particularly relevant when the first and second webpage documents are from different domains.

In methods and systems according to the above embodiment, first webpage data are received and modified prior to being sent to a browser. In particular, the first webpage data is modified such that a frame (comprising a second webpage document associated with a different domain to the first webpage document) is generated within the first webpage document. In addition, the first webpage data is modified with third webpage data arranged to cause the browser to allow access to functionality of the first webpage document by the second webpage document which would otherwise be blocked. Consequentially, embodiments are able to increase the functionality available to second webpage document, thus increasing the range of functionality which may be performed by the second webpage document, and improving the browsing experience.

In some arrangements, the generated frame may be an inline frame, which does not require a frameset to be constructed. The modifying may comprise injecting the second and third webpage data into the first webpage data, and conveniently these steps may be performed by a proxy server that intercepts the first webpage data en route for the browser.

A second exemplary embodiment provides a device comprising a browser, the browser being configured to: receive, via an interface, first webpage data, the first webpage data comprising second and third webpage data; and interpret, using a processor, the first webpage data whereby to generate a first webpage document, the browser being further configured to: interpret the second webpage data whereby to generate a frame within the first webpage document, the generated frame comprising a second webpage document, the second webpage document being associated with a different domain to the first webpage document; and interpret the third webpage data whereby to allow access to functionality of the first webpage document by the second webpage document which, without the third webpage data, would otherwise be blocked.

In some arrangements the second webpage data may be associated with scripting instructions, and the browser may be configured to interpret the scripting instructions whereby to dynamically generate a frame within the first webpage document. Optionally the second webpage data may comprise one or both of: at least a part of the scripting instructions, and a link to at least a part of the scripting instructions.

By including scripting instructions, the second embodiment is able to utilise the processing power of the client side browser, thus reducing the processing burden on the apparatus modifying the first webpage data (which may, for example, be a proxy server). Some scripting instructions may be directly injected into the first webpage document, while others may be linked to. This latter option may be used to further reduce the burden on the apparatus modifying the webpage data.

Conveniently the second webpage data may comprise an HTML "<iframe>" tag.

The third webpage data may be associated with script interface instructions, and the browser may be configured to interpret the script interface instructions whereby to allow access to functionality of the first webpage document by the second webpage document which would otherwise be blocked. Optionally, the third webpage data may comprise one or both of: at least a part of the said script interface instructions, and a link to at least a part of the said script interface instructions.

The third webpage data may cause the browser to allow access to functionality of the first webpage document by the second webpage document which would otherwise be blocked by providing script interface instructions within the first webpage document. The script interface may be written in JavaScript. This script interface instructions may be directly included, or included by reference, with the advantages described above.

In some arrangements, the browser may be configured to interpret the script interface instructions whereby to send information about the first webpage document to components within the second webpage document.

Components, i.e. a script or function, running within the second webpage document may be arranged to communicate using, for example, the standardised Cross Document Messaging procedure (postMessage). Therefore the script interface instructions may be arranged to communicate with such components within the second webpage document to enable the functionality to be provided.

Optionally, the information about the first webpage document which is sent to components within the second webpage document may comprise data indicative of one or more of: at least a part of the Document Object Model of the first webpage document; a Uniform Resource Locator associated with the first webpage document; a zoom factor of the first webpage document; and a position of the frame within the first webpage document.

Components, for example a script or function, running within the second webpage document may be arranged to communicate using, for example, the standardised Cross Document Messaging procedure (postMessage). Therefore the script interface instructions may be arranged to communicate with such components, to enable the functionality to be provided. Examples of the information which may be provided by the script interface instructions to the components within the second webpage are given above.

The browser may be configured to interpret the script interface instructions whereby to receive messages generated by an execution of components within the second webpage document. As such, responsive to a said message comprising predefined data, the browser may be configured to perform one or more of: modifying the display characteristics of the frame within the first webpage document; providing information about the first webpage by way of a response; and executing scripting instructions contained within the message.

The components within the second webpage document may send messages to the first scripting instructions, in which case the browser may be configured to receive (i.e. listen for) such messages so that an appropriate response or action may be performed. This enables the components within the second webpage document to make requests for information or actions, examples of which are given above.

In some embodiments the browser may be configured to interpret the script interface instructions whereby to authenticate the second webpage document in response to receiving a message. Optionally, the browser may be configured to interpret the script interface instructions whereby to provide functionality to the second webpage document in dependence on the second webpage document being authenticated.

As may be appreciated, the exact nature and identity of the second webpage document may not be known. In such situations the browser may authenticate the second webpage before providing functionality. This may be done by, for example alerting a user and receiving approval, or alternatively by sending a query to a server.

A third exemplary embodiment provides a computer program comprising a set of instructions for processing by a browser running on a device, the set of instructions comprising data served by a web server system, the set of instructions comprising: a first subset of instructions, which when executed by the browser, causes a frame to be generated within a webpage document generated by the browser and corresponding to the data served by the web server, the generated frame comprising a further webpage document, the further webpage document being associated with a different domain to the said webpage document; and a second subset of instructions, which when executed by the browser, causes the browser to allow access to functionality of the said webpage document by the further webpage document which, without the second subset of instructions, would otherwise be blocked.

The second subset of instructions may further be configured, when executed by the browser, to cause the browser to send information about the said webpage document to components within the second webpage document. Conveniently, the second subset of instructions may further be configured, when executed by the browser, to cause the browser to receive messages generated by an execution of components within the second webpage document. In some arrangements, the second subset of instructions may further be configured, when executed by the browser, to cause the browser to authenticate the second webpage document. Advantageously, one or both of the first and second subsets of instructions may further be configured, when executed by the browser, to cause the browser to retrieve additional instructions from the web server system.

A fourth exemplary embodiment provides a computer program comprising a set of instructions for processing by a browser running on a device, the set of instructions comprising: a first subset of instructions, which when executed by the browser, access functionality of a first webpage document; and a second subset of instructions, which when executed by the browser, communicate with components within a second webpage document, the second webpage document being within a frame within the first webpage document and being associated with a different domain to a domain associated with the first webpage document, wherein the first and second subset of instructions are arranged to cooperate such that the set of instructions, when executed by the browser, allow access to functionality of the first webpage document by the second webpage document which, without the set of instructions, would otherwise be blocked.

The set of instructions may be further configured, when executed by the browser, to send information about the first webpage document to components within the second webpage document. Conveniently the information about the first webpage document which is sent to components within the second webpage document may comprise data indicative of one or more of: at least a part of the Document Object Model of the first webpage document; a Uniform Resource Locator associated with the first webpage document; a zoom factor of the first webpage document; and a position of the frame within the first webpage document.

In some arrangements, the set of instructions may be further configured, when executed by the browser, to receive messages generated by an execution of components within the second webpage document. Conveniently the set of instructions may be further configured, when executed by the browser, and responsive to a said message comprising predefined data, to perform one or more of: modifying the display characteristics of the frame within the first webpage document; providing information about the first webpage by way of a response; and executing scripting instructions contained within the message.

The set of instructions may be further configured, when executed by the browser, to authenticate the second webpage document in response to receiving a message. Optionally, the set of instructions may be further configured, when executed by the browser, to provide functionality to the second webpage document in dependence on the second webpage document being authenticated.

Further features and advantages of the invention will become apparent from the following description of preferred embodiments, given by way of example only, which is made with reference to the accompanying drawings.

BRIEF DESCRIPTION OF THE DRAWINGS

Methods and systems for modifying webpage data will now be described as an embodiment, by way of example only, with reference to the accompanying figures in which:

FIGS. 4A to 4F show browser windows as might be displayed by a browser;

Several parts and components appear in more than one Figure; for the sake of clarity the same reference numeral will be used to refer to the same part and component in all of the Figures.

DETAILED DESCRIPTION OF ILLUSTRATIVE EMBODIMENTS

Embodiments relate to methods and systems for modifying webpage data intended for receipt by a browser. It will be apparent that such systems and methods have applicability in many situations.

Nevertheless, the following will describe particular embodiments in which a webpage is modified to include an application toolbar which may be used to launch "apps". In these embodiments, a user interacting with a browser may navigate to a particular website. From the user's perspective, the website is retrieved as would be expected. However, in addition to the requested webpage, a toolbar is provided within the browser window. The toolbar may be floating, or arranged along an edge of the browser window. The user may interact with the toolbar, and in doing so, may interact with an "app" presented within the toolbar.

To provide the toolbar to the user, these embodiments operate by intercepting webpage data intended for receipt by a browser, and modifying the intercepted webpage data prior to providing it to the browser. The modification causes the webpage document generated from the original, intercepted, webpage data (henceforth "host webpage document") to be generated with one or more frames (typically an inline frame or iFrame) embedded therein. At least one webpage document (henceforth termed "toolbar webpage document") are then loaded into the frame. The effect of the system is that a browser will display, in addition to the requested host webpage document, the toolbar within the iFrame. The toolbar webpage document may contain a number of Apps, with which the user may interact via the toolbar.

Figure 1:
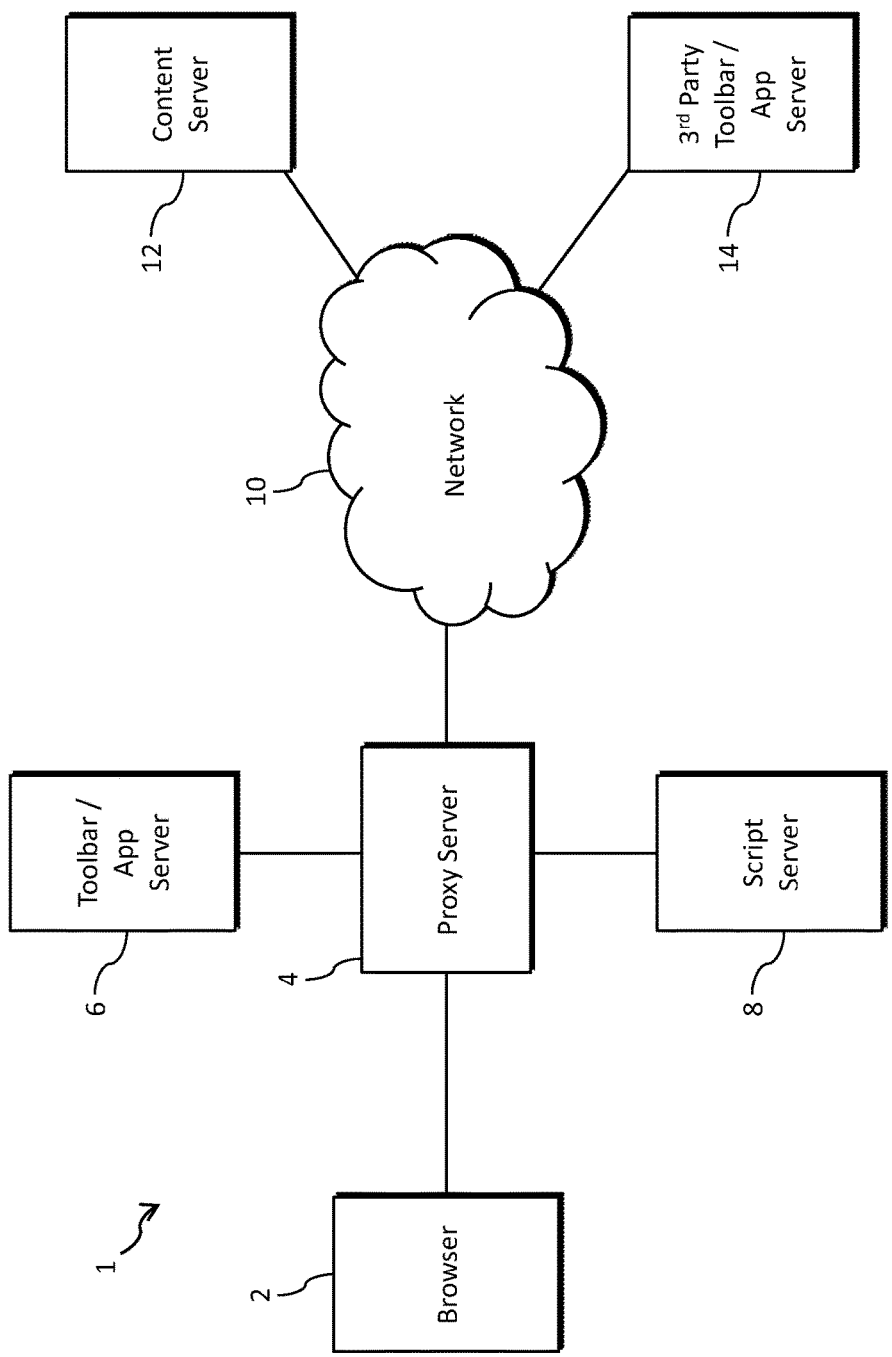
FIG. 1 shows a schematic diagram of a system according to an embodiment.

FIG. 1 shows a schematic diagram of a system 1 for modifying a webpage according to an embodiment. In the system 1, a browser 2 (typically an application on a device such as a desktop computer, Smart TV, laptop, tablet, PDA or smartphone) is connected to a proxy server 4. As will be described below, the proxy server 2 serves as an intermediary for data traffic sent to and from the browser 2.

Connected to the proxy server 4 are Toolbar/App server 6 (henceforth TA server) and script server 8. The proxy server 4 is further connected to a network 10 (such as the internet). Through the network 10, the proxy server 2 is connected to a content server 12 and may additionally be connected to a 3$^{rd}$ party TA server 14. The TA servers 6 and 14 and the content server 12 are in different domains.

It will be appreciated that the system and the connections shown are simplifications and that embodiments may operate in substantially more complex systems. For instance the connection between the browser 2 and the proxy server 4 may be via a cellular telephone network, and as such include components, known in the art, which enable a mobile device such as a smartphone to communicate data.

Figure 2:
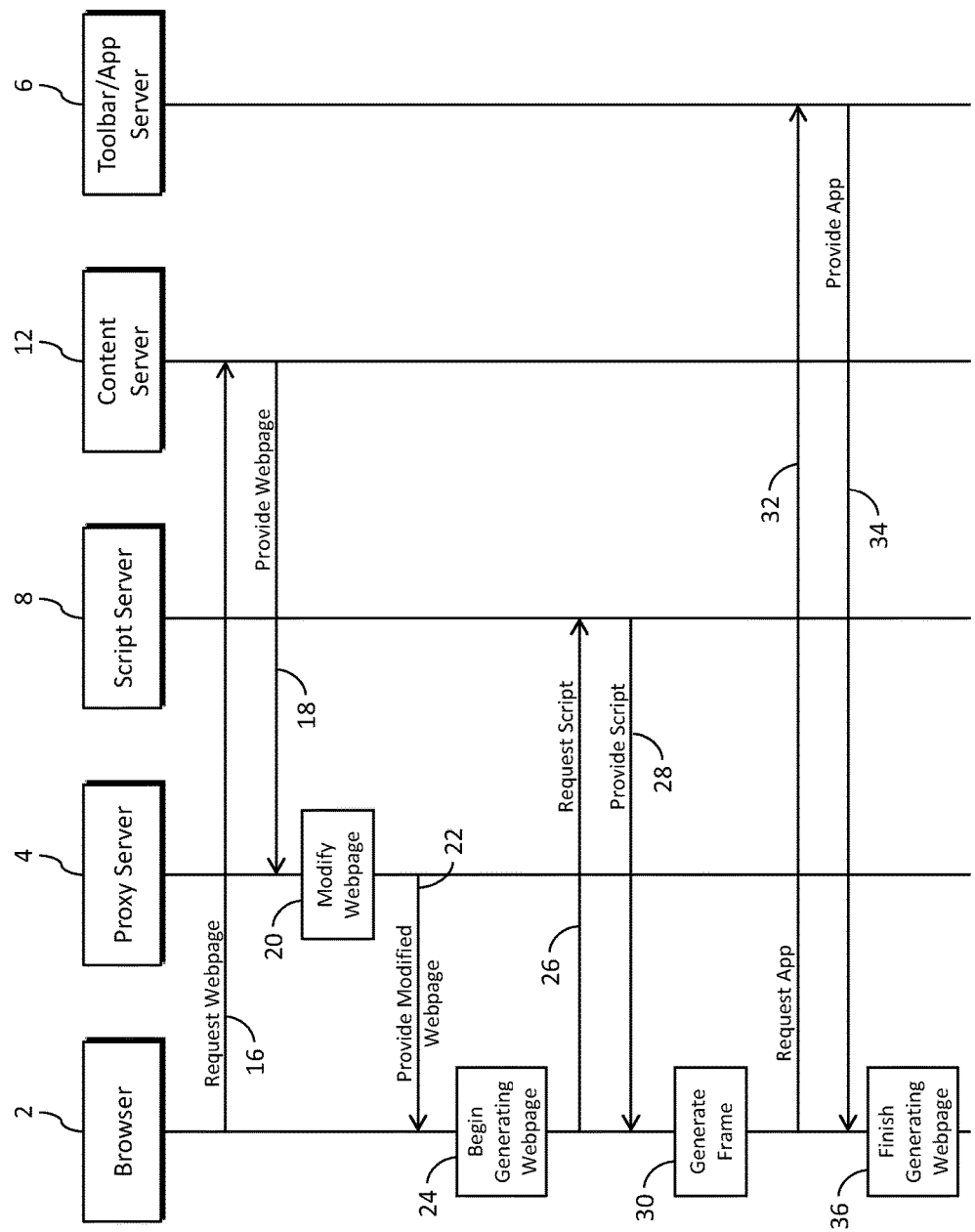
FIG. 2 shows a method according to an embodiment.

A method by which the system 1 operates in accordance with an exemplary embodiment will now be described with reference to FIG. 2. In FIG. 2, the browser 2, proxy server 4, script server 8, content server 12 and TA server 6 are shown. It will be appreciated that the TA server 6 and 3$^{rd}$ party TA server 14 provide similar roles in the system, and therefore only one (TA server 6) is shown for simplicity.

In the system described above, the browser 2 was connected to servers 6, 8, 12 and 14 through the proxy server 4. As such all messages (i.e. requests and responses) between the browser 2 and these servers will pass through the proxy server 4. For conciseness, in FIG. 2 and the description below, where messages merely pass through the proxy server, no explicit description is given of receiving a message at the proxy server 4, and forwarding the message on.

In a first step 16, the browser 2 sends a request for a webpage (the host webpage) to the content server 12. The request may be a HTTP request, and may identify the content server 12 by a Uniform Resource Locator (URL) or Internet Protocol (IP) address as is known in the art. The request is subsequently received by the content server 12 and, in step 18, a response is sent back to the browser 2. The response comprises the host webpage data, and may form an HTTP response containing marked up text according to the HTML, XML, XHTML or similar standards.

The response is received by the proxy server 4 and, in step 20, the proxy server modifies the host webpage data received in step 18. This modification process will be described in more detail in FIG. 3 below. Having modified the webpage data, in step 22, the proxy server 4 sends the modified host webpage data to the browser 2.

In step 24 the browser 2 begins to generate the host webpage document based on the modified host webpage data received in step 22. Methods by which a browser 2 may create the host webpage document based on received webpage data are known in the art, nevertheless, some examples of the steps involved are:
  retrieving referenced or linked webpage data, such as images, audio files and/or video;
  retrieving external style sheet data (e.g. CSS data);
  formatting webpage data according to style sheet data (e.g. placing elements within the webpage document and providing the appropriate fonts, colour, etc to elements within the webpage document;
  retrieving external script data (e.g. JavaScript data);
  executing any external or embedded script (e.g. JavaScript) such as "on Load" functions (which are written to be executed when the webpage document is generated or loaded, and which may, for example, retrieve additional content, or modify the webpage document itself); and
  embedding any external webpage documents within frames, typically inline frames or iFrames.

In some embodiments, modification of the host webpage data performed in step 20 may involve injection of one or more links to script data (typically one or more files containing client side scripting instructions such as JavaScript or ".js" files). Therefore, during the generation of the host webpage document, as shown by step 26, the browser 2 may request the script data from script server 8. Subsequently in step 28, the script server 8 provides the script data to the browser 2. The scripting instructions contained within the script data retrieved in steps 26 and 28 will then form a part of the generated host webpage document. In addition, some of the scripting instructions may be immediately executed, causing the generated host webpage document to be modified, and potentially causing further webpage data to be downloaded by the browser 2.

In preferred embodiments, the modification of the host webpage data in step 20 causes a frame to be generated within the host webpage document. The generation of the frame is shown in step 30. The generated frame, which may be an inline frame or iFrame, contains a link to a toolbar webpage document.

Therefore, in step 32, the browser 2 requests the toolbar webpage document from a server identified by the link associated with the frame, in this embodiment, the link identifies the TA server 6, to which the request is sent. The TA server 6 responds, in step 34, by providing toolbar webpage data to the browser 2. The browser 2 will then generate a toolbar webpage document based on the received toolbar webpage data.

The process of generating the host webpage then ends at step 36, at which point the host webpage document, along with the toolbar webpage document contained within the iFrame, may be displayed to a user. The user may subsequently interact with the host webpage document and toolbar webpage document, examples of such interaction are provided below. The user may navigate to a different page, at which point the method described above may be repeated.

Figure 3:
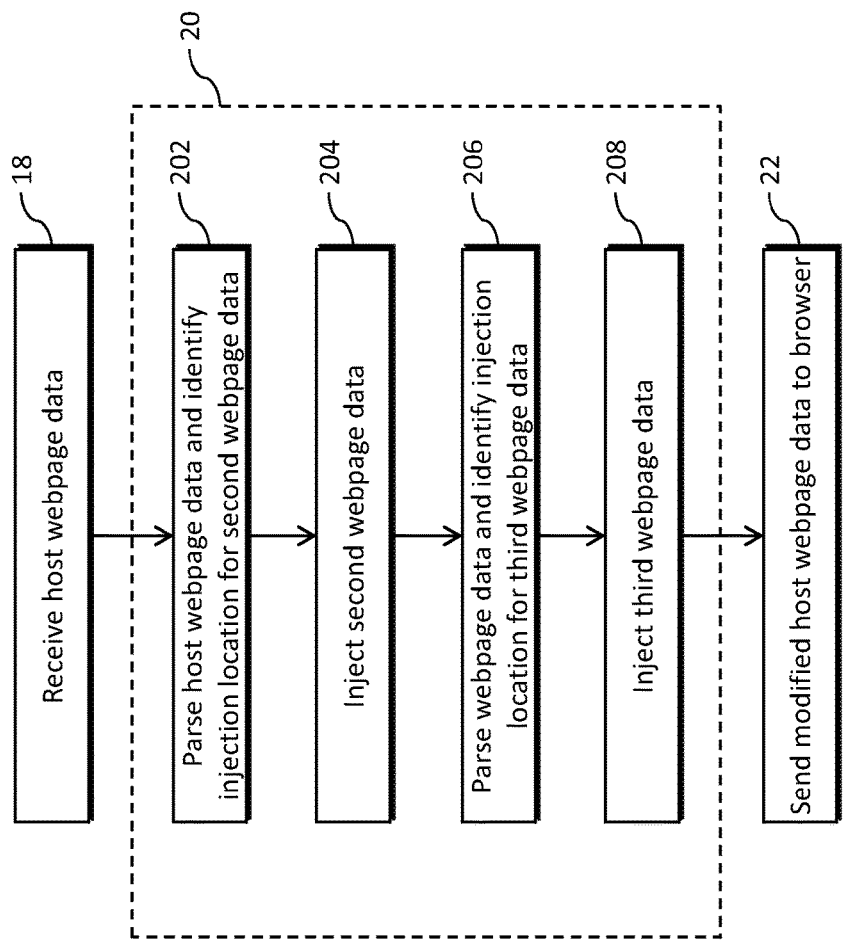
FIG. 3 shows a method according to an embodiment.

A method of modifying host webpage data according to an embodiment will now be described with reference to FIG. 3. The steps described in FIG. 3 correspond, at least in part, to steps 18, 20 and 22 of FIG. 2. Therefore, where applicable, the steps have been given the same reference numerals.

In step 18 the proxy server receives the host webpage data. The subsequent steps 202, 204, 206 and 208 in combination correspond to step 20 of FIG. 2, as represented by the dashed box 20.

The modification of the host webpage data by the proxy server 4 involves using two distinct portions of webpage data, referred to herein as second and third webpage data. The insertion of the second webpage data causes a frame to be generated within the host webpage document as described above with reference to step 30. The insertion of the third webpage data causes the browser to allow access to functionality of the host webpage document by the toolbar webpage document which would otherwise be blocked. In particular, the insertion of the third webpage data causes script interface instructions (henceforth a JavaScript API) to be included into the host webpage document. The effect of the JavaScript API will be described in more detail below.

To modify the host webpage data, in step 202, the proxy server parses the received host webpage data and identifies a location for the injection of the second webpage data, and thus a location for a frame that will be generated within the host webpage document. Subsequently, in step 204, the proxy server injects the second webpage data at the identified location.

The second webpage data may take any of a number of forms. In some embodiments, the second webpage data may comprise HTML, XHTML, or similar marked-up text explicitly creating a frame element. For example, the following text may be directly injected into the received host webpage data:
  <iframe src="www.exampletaserver.com/toolbar1.html">
  </iframe>
In such embodiments, the injection location may be identified to be any suitable location within the <body> element of the host webpage document, typical examples being at the beginning or at the end of the <body> element. The location identified in step 202 would therefore correspond to such locations.

Alternatively, the second webpage data may comprise scripting instructions which cause a frame to be dynamically generated within the host webpage document when it is generated by the browser 2. Such scripting instructions may be written in JavaScript (although other languages may be used). As an example, the following JavaScript code may be directly injected into the host webpage data.

<script language="JavaScript" type="text/javascript">
window.onload=function( ){

-continued

```
ifrm = document.createElement("IFRAME");
ifrm.setAttribute("src", "www.exampletaserver.com/toolbar1.html");
document.body.appendChild(ifrm);
}
</script>
```

The above script causes an iFrame element to be created within the host webpage document once the host webpage document has been loaded by the browser. There are few restrictions on where script data, such as the JavaScript above, may be loaded within a webpage and still have an effect. Nevertheless, some exemplary locations which might be used, and therefore identified in step 202, are:
- within the <head> element of an HTML or similar document;
- at the end of a <body> element of an HTML or similar document; and
- at the end of the document, irrespective of contents, this latter option has the advantage that it reduces the parsing needed to be performed by the proxy server 4.

In an alternative arrangement, the scripting instructions may be referenced by the second webpage data. As such the second webpage data may take the form of a script pointer such as:

```
<script src="http://www.examplescriptserver.com/createframe.js"
    type="text/javascript" > </script>
```

This causes the browser 2 to retrieve a file containing JavaScript from the location http://www.scriptserver.com/createframe.js and incorporate the JavaScript into the host webpage document. The file "createframe.js" may contain scripting instructions, such as those described above, for creating a frame. In a similar manner to the direct injection of script data described above, a script element linking to external code may be included anywhere within the host webpage data. As such the locations identified in step 202 for a script pointer may be the same as those described above for the direct injection of script data. It will be understood, that the script server from which the scripting instructions are retrieved may correspond to script server 8 described in FIGS. 1 and 2.

In step 206, the proxy server parses the host webpage data to identify an injection location for third webpage data. The third webpage data is configured to cause the browser to allow access to functionality of the first webpage document by the second webpage document which would otherwise be blocked. Typically this access is allowed by incorporating scripting instructions, the JavaScript API mention above, into the host webpage document. The JavaScript API may be directly injected, or referenced by a link. Methods by which scripting instructions may be injected, or alternatively referenced, have been described above, so will not be repeated here.

Consequently, in step 208, the third webpage data is injected at the location identified in step 206. Finally, in step 22, the modified webpage data is sent to the browser.

As described above, the host webpage data is modified using both second and third webpage data. The effects of these modifications, and the nature of the scripting instructions which are included into the host webpage document because of the modifications will now be described with reference to FIGS. 4A . . . F and 5A . . . C.

In the following description, messages will be described as being sent from the host webpage document to the toolbar webpage document, and vice versa. It will be understood that the documents themselves do not send the messages, but rather the scripting instructions within the documents, when executed by the device running the browser, cause messages to be transferred within the said device. Nevertheless, for clarity the messages will be described as being passed from one document to the other. This will be used to indicate that a function in the scripting instructions of one document is passing data to a function in the scripting instructions of another document.

Figure 4C:
Figure 4B:
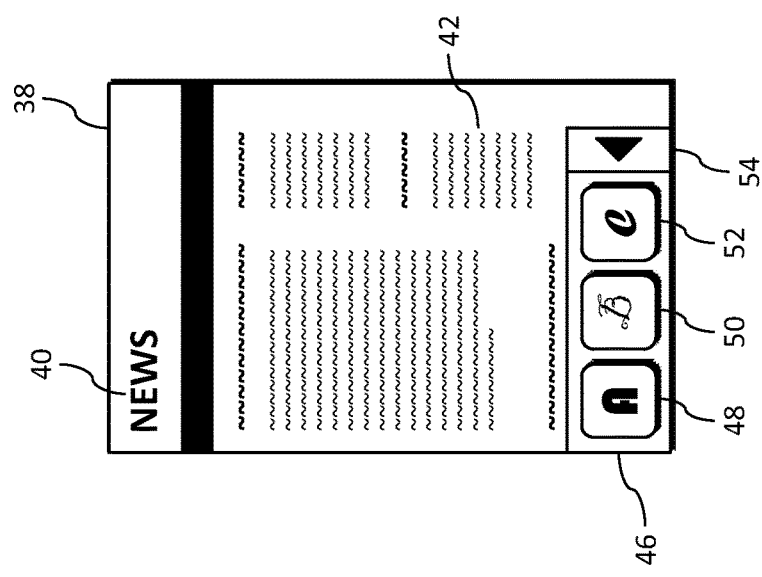
Figure 4A:
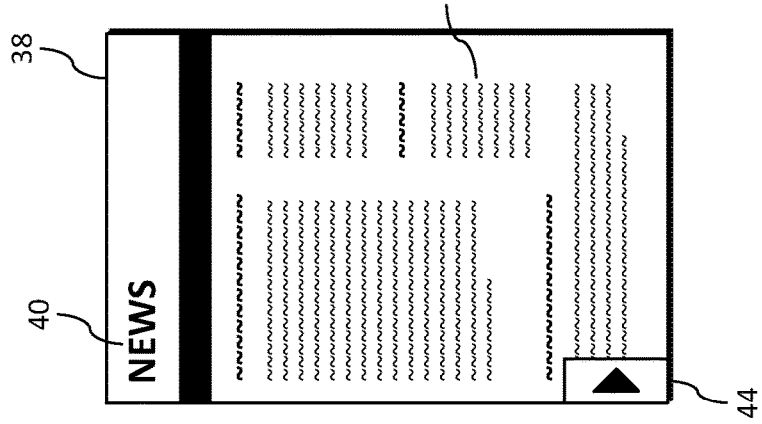

FIGS. 4A . . . E show diagrams of how a browser window may be viewed when a browser receives modified host webpage data according to embodiments. FIG. 4F is provided for comparison purposes, and shows a diagram of how a browser window (similar to that of FIGS. 4A . . . E) might be viewed in a system in which the third webpage data is not inserted into the host webpage data.

In all of FIGS. 4A . . . E, the browser has requested host webpage data according to a selected URL from the content server 12. This host webpage data has been modified by the proxy server 4 as described above, and from the modified host webpage data, the browser 2 has generated a webpage as shown in FIGS. 4A . . . E. It will be apparent that many webpages on the world-wide-web may be used in such a context, however in this example, the webpage document is a hypothetical news document, showing a heading, "News" and a series of articles.

As also described above, the TA servers 6 and 14 and the content server 12 are in different domains. For instance, the host webpage document (obtained by requesting the host webpage data from the content server 12) may be associated with the URL:
www.examplecontentserver.com/index.html,
and therefore with the domain:
www.examplecontentserver.com.
By contrast the toolbar webpage data (obtained by requesting the toolbar webpage data from the TA server 6) may be associated with the URL:
www.exampletaserver.com/toolbar1.html.
and therefore with the domain:
www.exampletaserver.com.

When data is from different domains, for example in this case where the host webpage document is associated with a different domain to the toolbar webpage document within an embedded iFrame, then most browsers effect a "Same Origin Policy" which prevents or severely limits the ability of one webpage document to access the functionality of the other. For instance, a script component within the toolbar webpage document will be unable to access or change the properties of the host webpage document (these properties may include, for example, how the iFrame is presented within the host webpage document).

The effects of a "Same Origin Policy" or similar, and equally of including the third webpage data by the proxy server will be described with reference to FIGS. 4A . . . E.

In FIG. 4A, the host webpage is viewed in a window 38. The window contains a news webpage, showing a header "News" 40 and a series of articles 42. This host webpage document is as provided by the content server 12 and the content and layout is as specified by the content server 12.

In the lower left hand corner of the browser window 38 is a tab 44 containing an arrow pointing to the right. This tab 44 is an iFrame embedded within the host webpage document. The positioning and size of the iFrame is a property of the host webpage document. In injecting the iFrame, the proxy server may have specified this size and position. The iFrame, as described above contains the toolbar webpage document, which currently only displays the tab 44.

FIG. 4B shows the result of a user selecting (i.e. clicking or tapping) on the tab 44. The browser window 38, news banner 40 and articles 42 remain. However, the iFrame has been expanded across the host browser display 38 and the toolbar webpage document now contains three distinct icons, 48, 50 and 52, labelled A, B and C respectively in addition to a tab 54.

It is apparent that the size and shape of the iFrame has been altered. It is known in the art that a property of a webpage document may be altered by selecting (i.e. clicking or tapping) on a given portion of the webpage document, the change being effected by scripting instructions, such as a JavaScript function. However, in the example shown above, the action was taken with respect of the toolbar webpage document within the iFrame. As a result, any JavaScript function which may be called would be executed with regards to the toolbar webpage document within the iFrame.

As a consequence, and due to a "Same Origin Policy" implemented by a browser, without the functionality provided by the present embodiments, the function called within the iFrame will be unable to change the properties of the host webpage document. In particular, the size and shape of the iFrame is defined solely by the document object model (DOM) of the host webpage document. Consequently, a first utility (and correspondingly an advantage) of modifying the host webpage with the third webpage data can be illustrated.

As described above, the injection of the third webpage data leads to a JavaScript API being provided within the host webpage document. Consequently, using one of a number of known cross-document messaging techniques, for example the standardised (in HTML5) ".postMessage" function, scripting instructions within the toolbar webpage document (itself within the iFrame) is able to send a message to the JavaScript API within the host webpage document. The message may indicate that the user has performed an action requiring a change to the host webpage document (i.e. changing the size of the iFrame).

The JavaScript API may consequently modify the properties of the host webpage document, for example modifying the DOM of the host webpage document. As such the JavaScript API may cause the size and shape of the iFrame to be changed, irrespective of any Same Origin Policy restrictions. In this example, the size of the iFrame is altered so that the toolbar gives the appearance of being extended into the host webpage document.

A similar technique may be used to provide the effect shown in FIG. 4C. FIG. 4C shows the result of a user selecting (i.e. clicking or tapping) on the 'A' icon 48. In this case, selecting the 'A' icon 48 causes the app 'A' to be launched, and thereby occupy the full area of the browser window 38.

Within the toolbar webpage document the properties of the App 'A' may be easily changed, because the App 'A', being a part of the toolbar webpage document, is not subject to same origin policy restrictions. However, once again, the size and shape of the iFrame needs to be modified to allow the App 'A' to occupy the whole of the browser window 38. In a similar manner to that described above, the effect may be provided by allowing the scripting instructions within toolbar webpage document to send a cross-document message to the JavaScript API, requesting that the appropriate changes be made to the properties of the host webpage document.

While FIGS. 4A . . . C show how commands may be sent from scripting instructions within the toolbar webpage document (itself within the iFrame) to the host webpage document, the reverse may also apply. FIGS. 4D and 4E show how the JavaScript API may send messages to scripting instructions within the toolbar webpage document, and correspondingly cause changes to be made to the properties of the toolbar webpage document. FIG. 4F is provided as a comparison, to show what might happen if the messages were not sent (i.e. if the JavaScript API is not provided).

FIG. 4D is the same as that shown in FIG. 4B, and the same reference numbers are provided. FIGS. 4E and 4F show the effect the user zooming in on a portion of the host webpage. As mentioned above, in FIG. 4E the JavaScript API is provided within the host webpage document, while FIG. 4F is where the JavaScript API has not been provided.

Both FIGS. 4E and 4F show the results of the host webpage document being magnified, with a single article 42 from the news webpage occupying the majority of the browser window 38. When a user zooms in on a host webpage document, the document as a whole is zoomed, meaning that relative size and position of any iFrame contained within the host webpage document will be correspondingly modified. As can be seen from FIG. 4F, the toolbar (now referenced 46) has been magnified in line with the host webpage document. Consequently only a portion of icon 52 (now referenced 52') and tab 54 (now referenced 54') are visible. This is not desirable, since while the user may be able to more easily read the news article 42, the toolbar has become difficult to use, and a user would have to zoom out to, for example, activate app 'A'.

FIG. 4E shows a more desirable result, in which, while the host webpage has been zoomed, the toolbar 46 remains unchanged with respect to the browser window 38. To achieve this effect, the size and position of the iFrame relative to the host webpage document will need to be modified. Moreover, the sizes of the icons 48, 50 and 52 within the toolbar webpage document will need to be changed.

This effect is enabled by providing the JavaScript API with the functionality to identify any changes to the host webpage document, and to alert the toolbar webpage document within the iFrame that such changes have occurred. The communication between the JavaScript API and any apps within the iFrame may again be done using a cross-document message.

Figure 5B:
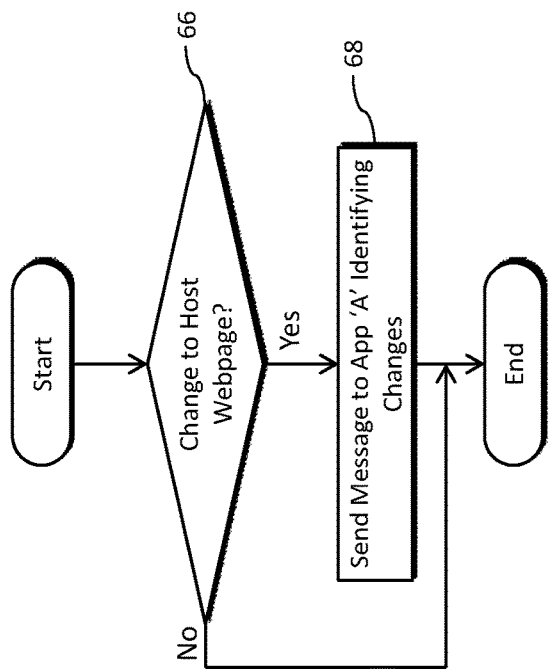
FIGS. 5A and 5B show methods according to an embodiment.

Two generalized methods by which the JavaScript API may communicate with toolbar webpage document within an iFrame will now be described with reference to FIGS. 5A and 5B. Both of the methods are described from the perspective of the host webpage document, and therefore reflect the scripting instructions provided in the JavaScript API.

Figure 5A:
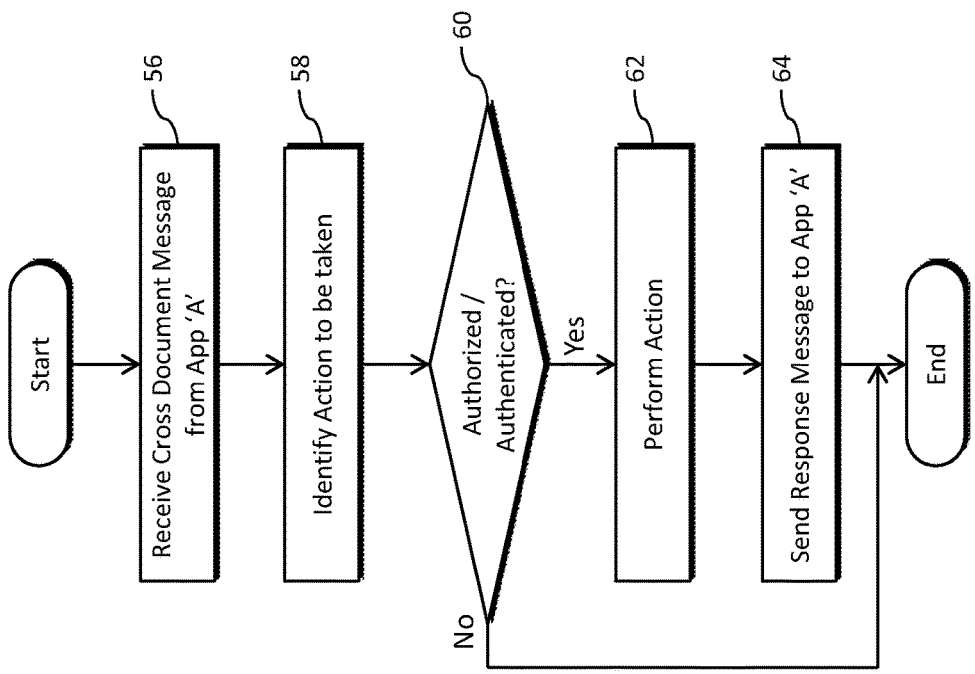

FIG. 5A describes a method by which the JavaScript API may respond to messages from the toolbar webpage document within an iFrame. This may be done, as described above with reference to FIG. 4B, to change the size and shape of the iFrame.

In step 56 the JavaScript API receives a cross-document message from scripting instructions within the toolbar webpage document.

In response to receiving the request in step 56, the JavaScript API, in step 58, parses the message to identify the action requested in the message. The message may request one of a number of actions to be taken, some examples are:
  Changing a property of the host webpage document, for instance the position of the iFrame within the host webpage document.

Responding with information about the host webpage document. This information may be, for example, properties of the host webpage document, or the URL of the host webpage document.

Execution of specific scripting instructions against the host webpage document. In other words, running scripting instructions (which may be sent in the message) as if they were scripting instructions contained within the host webpage document (and therefore free from any restrictions).

Having identified the action requested, the JavaScript API may, in step 60, determine if the source of the message, and/or the action requested, is authorized and/or authenticated. There are a number of known techniques for the authorization/authentication of a sender of a message, and any known technique may be used. However some particular examples of how the JavaScript API may authorization/authentication the origin of the message are:

Determining whether the message is provided with a particular token or other coded data. The toolbar webpage document may have been provided with a suitable token when it is loaded into the iFrame.

Querying a server with identifying information about the toolbar webpage document sending the message. The server may be the proxy server 4, or a server connected thereto and provided by the institution providing the modification service.

Providing an alert to a user, requesting that the user authorize any action which may be taken based on the message.

If the authorization/authentication in step 60 fails then the JavaScript API takes no further action. In the alternative, if the authorization/authentication in step 60 is successful, then in step 62 the JavaScript API may perform the requested action (examples given above).

Once the requested action has been taken, the JavaScript API may, in step 64, send a response message to the toolbar webpage document. This response may contain details of requested properties of the host webpage. Alternatively, the response may simply contain a confirmation of the original message being received in step 56.

An alternative method, by which the JavaScript API may send data to the toolbar webpage document without first receiving a message from the toolbar webpage document, will be described in FIG. 5B. This method may be used to provide effects such as the zooming correction shown in FIGS. 4D and 4E.

In step 66 the JavaScript API tests whether there has been a change to the host webpage, for instance zooming or scrolling of the host webpage. If there is no change or there is no change for which the toolbar webpage document needs to be notified, then the JavaScript API will take no action. If however, there is a change, then in step 68 the JavaScript API sends a message (i.e. a cross-document message) to the toolbar webpage document identifying the changes. The method then ends, however the JavaScript API may repeat the method at regular intervals, or upon an appropriate trigger event.

Additional Details and Modifications

The toolbar webpage document has been described as providing both the launcher for the apps (the icons 48, 50 and 52), and the apps themselves (the launching of app A in FIG. 4C). To generate this effect, the data used to generate the toolbar webpage document may be constructed from a number of subsets of instructions, at least one representing the launcher toolbar system itself and others representing the different apps (including icon, and the app functionality). Each subset of instructions may be referenced by a different script pointer, i.e. a <script> tag in HTML.

In some embodiments, multiple iFrames may be generated within the host webpage document, each containing a webpage document corresponding to an app. In other embodiments, the toolbar webpage document may itself contain a number of iFrames, each containing an app.

In either system, different apps may be selected for different users. Equally, some apps may be provided by the TA server 6, while others may be provided by the $3^{rd}$ party TA server 14. If third party apps are provided, then the authentication describe above may take into account the identity of an app sending a message before acting on that message.

In the embodiments described above, the proxy server 4, script server 8 and TA server 6 were described as being separate entities. This may not necessarily be the case, and any combinations of one or more servers, i.e. a server system, may be used to provide the webpage data to the browser. In addition, further servers, not shown in FIG. 1, may be provided in the system. For instance a Provisioning Server may be provided to store user specific settings, for example, the apps a user desires. An App Manager may be provided. The App manager may provide a web interface to the browser to allow users to configure the Apps that are injected into their toolbars.

In some embodiments, the proxy server may inject the same data into the host webpage data irrespective of the user/browser to which the host webpage data is being sent. Subsequently, as the browser generates the host webpage document, user personalized data may be provided by causing the browser to identify itself, and or the user, in any requests for e.g. a script. This has the advantage of reducing the load on the proxy server 4.

In some embodiments, $3^{rd}$ party apps may be retrieved from the $3^{rd}$ party TA server 14, and stored locally on, for example, the TA server 6.

Should some or all of the apps be provided by third parties, the JavaScript API may provide a standardised interface for receiving messages from an app. A non-limiting list of examples include:

Fullscreen( ): allows code in the iFrame to expand the iFrame to full screen; this is used by the Apps to draw user interface elements on a full screen canvas.

PageContents( ) sends a copy of the DOM of the underlying page to an App in the iframe.

OpenToolbar( ) actually a toggle function that opens/closes the toolbar in response to request from toolbar code running in the iframe.

hideToolbar( ): sends the toolbar off screen.

Equally, the JavaScript API may be configured to send particular standardised information to any apps, a non-limiting list of examples include:

When page load is complete a context message that contains the following data: 'planlist, transactionlist, subscriberid, operatorid, dateandtime, originalurl, location, sourceip, toolbarid'. This data is supplied by Integra and based on the current page request for a specific user.

Whenever a scroll or zoom event occurs; the message contains the zoom factor, x and y offsets.

Finally, the JavaScript API may be configured with a limited ability to modify and or enhance the contents of the host webpage document (preferably upon receipt of messages from the toolbar webpage document), for example:

hightlightText( ) highlights text within the host webpage document which conforms to specified criteria.

It will be apparent that a toolbar is only one example of the functionality which may be provided by the above described embodiments, and that other functions, such as providing advertisements, widgets, overlays, enhanced functionality and the like may be provided.

Figure 6:
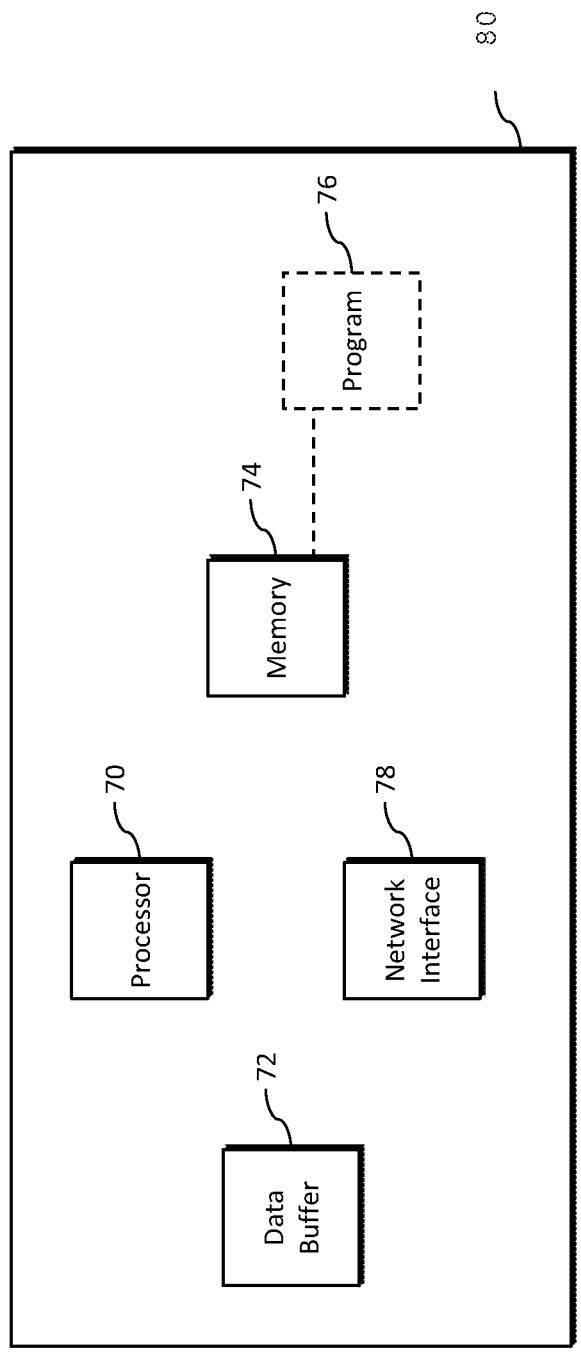
FIG. 6 shows a schematic diagram of a device according to an embodiment.

Reference is now made to FIG. 6 for illustrating a simplified block diagram of a computer system 80 that is suitable for use in practicing the exemplary embodiments. In particular embodiments, the computer system 80 described in FIG. 6 is configured for communications using the Internet Protocol (IP) suite of standards. In one embodiment, the computer system 80 may be implemented as the proxy server 4. In another embodiment, the computer system 80 may be implemented as a device on which the browser 2 runs.

In an embodiment, the computer system 80 includes processing means such as at least one data processor 70, storing means including a data buffer 72 and at least one computer-readable memory 74 storing at least one computer program 76. The computer system 80 further includes communicating means such as a network interface 78 which may be used to receive and send webpage data as described above.

The computer program 76 comprises a set of instructions that, when executed by the associated processor 70, enable the computer system 80 to operate in accordance with the exemplary embodiments described above. In these regards the exemplary embodiments may be implemented at least in part by computer software stored on the memory 74, or by hardware, or by a combination of tangibly stored software and hardware (and tangibly stored firmware).

Various embodiments of the computer readable memory 74 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 70 include but are not limited to general purpose computers, special purpose computers, microprocessors, digital signal processors (DSPs) and multi-core processors.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The above exemplary embodiments are to be understood as illustrative examples of the invention. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer implemented method of modifying first webpage data on the basis of second webpage data and third webpage data, the first webpage data being for receipt by a browser of a device, the browser being configured to interpret the first webpage data whereby to generate a first webpage document, the method comprising:
receiving, via an interface, the first webpage data;
modifying, using a processor, the first webpage data using the second and third webpage data; and
sending, via the interface, the modified first webpage data to the browser, wherein, when executed by the browser:
the second webpage data causes a frame to be generated within the first webpage document, the generated frame comprising a second webpage document, the second webpage document being associated with a different domain to the first webpage document; and
the third webpage data causes the browser to send information about the first webpage document to components within the second webpage document,
wherein the information is sent by messaging within the device running the browser,
wherein the information comprises data indicative of a zoom factor identifying zooming in on the first webpage document,
and wherein the information comprises data indicative of an alert to modify the size and position of the generated frame relative to the first webpage document to prevent the identified zooming in on the first webpage document from magnifying the second webpage document.

2. The computer implemented method of claim 1, wherein the generated frame is an inline frame.

3. The computer implemented method of claim 1, wherein the modifying comprises injecting the second and third webpage data into the first webpage data.

4. The computer implemented method of claim 1, wherein the messaging comprises cross-document messaging.

5. A device comprising a browser of a device, the browser being configured to:
receive, via an interface, first webpage data, the first webpage data comprising second and third webpage data; and
interpret, using a processor, the first webpage data whereby to generate a first webpage document,
the browser being further configured to:
interpret the second webpage data whereby to generate a frame within the first webpage document, the generated frame comprising a second webpage document, the second webpage document being associated with a different domain to the first webpage document; and
interpret the third webpage data whereby to send information about the first webpage document to components within the second webpage document,
wherein the information is sent by messaging within the device running the browser,
wherein the information comprises data indicative of a zoom factor identifying zooming in on the first webpage document,
and wherein the information comprises data indicative of an alert to modify the size and position of the generated frame relative to the first webpage document to prevent the identified zooming in on the first web page document from magnifying the second webpage document.

6. The device of claim 5, wherein the second webpage data is associated with scripting instructions, and the browser is configured to interpret the scripting instructions whereby to dynamically generate the frame within the first webpage document.

7. The device of claim 6, wherein the second webpage data comprises one or both of:
at least a part of the scripting instructions; and
a link to at least a part of the scripting instructions.

8. The device of claim 5, wherein the second webpage data comprises an HTML "<iframe>" tag.

9. The device of claim 5, wherein the third webpage data is associated with script interface instructions, and the browser is configured to interpret the script interface instructions whereby to allow access to functionality of the first webpage document by the second webpage document which would otherwise be blocked.

10. The device of claim 9, wherein the third webpage data comprises one or both of:
at least a part of the said script interface instructions, and
a link to at least a part of the said script interface instructions.

11. The device of claim 9, wherein the browser is configured to interpret the script interface instructions whereby to receive messages generated by an execution of components within the second webpage document.

12. The device of claim 11, in which, responsive to a said message comprising predefined data, the browser is configured to interpret the script interface instructions whereby to perform one or more of:
modifying the display characteristics of the frame within the first webpage document;
providing information about the first webpage by way of a response; and
executing scripting instructions contained within the message.

13. The device of claim 11, wherein the browser is configured to interpret the script interface instructions whereby to authenticate the second webpage document in response to receiving one of the messages.

14. The device of claim 13, wherein the browser is configured to interpret the script interface instructions whereby to provide functionality to the second webpage document in dependence on the second webpage document being authenticated.

15. A computer program product comprising a non-transitory computer-readable storage medium having a set of computer readable instructions stored, thereon, the set of computer readable instructions being executable by a browser of a device, the browser running on a computerized device, the set of computer readable instructions comprising data served by a web server system, the set of computer readable instructions comprising:
a first subset of instructions, which when executed by the browser on the computerized device, causes a frame to be generated within a webpage document generated by the browser and corresponding to the data served by the web server, the generated frame comprising a further webpage document, the further webpage document being associated with a different domain to the said webpage document; and
a second subset of instructions, which when executed by the browser on the computerized device, causes the browser to send information about the said webpage document to components within the further webpage document,
wherein the information is sent by messaging within the device running the browser,
wherein the information comprises data indicative of a zoom factor identifying zooming in on the first webpage document,
and wherein the information comprises data indicative of an alert to modify the size and position of the generated frame relative to the first webpage document to prevent the identified zooming in on the first web page document from magnifying the second webpage document.

16. The computer program product of claim 15, wherein the second subset of instructions are further configured, when executed by the browser on the computerized device, to cause the browser to receive messages generated by an execution of components within the second webpage document.

17. The computer program product of claim 15, wherein the second subset of instructions are further configured, when executed by the browser on the computerized device, to cause the browser to authenticate the second webpage document.

18. The computer program product of claim 15 wherein one or both of the first and second subsets of instructions are configured, when executed by the browser on the computerized device, to cause the browser to retrieve additional instructions from the web server system.

19. A computer program product comprising a non-transitory computer-readable storage medium having a set of computer readable instructions stored thereon, the computer readable instructions being executable by a browser of a device, the browser running on a computerized device, the set of instructions comprising:
a first subset of instructions, which when executed by the browser on the computerized device, access functionality of a first webpage document; and
a second subset of instructions, which when executed by the browser on the computerized device, communicate with components within a second webpage document, the second webpage document being within a frame within the first webpage document and being associated with a different domain to a domain associated with the first webpage document,
wherein the first and second subset of instructions are arranged to cooperate such that the set of instructions, when executed by the browser on the computerized device, cause the browser to send information about the first webpage document to components within the second webpage document,
wherein the information is sent by messaging within the device running the browser,
wherein the information comprises data indicative of a zoom factor identifying zooming in on the first webpage document,
and wherein the information comprises data indicative of an alert to modify the size and position of the generated frame relative to the first webpage document to prevent the identified zooming in on the first web page document from magnifying the second webpage document.

20. The computer program product of claim 19, wherein the set of instructions are further configured, when executed by the browser on the computerized device, to receive messages generated by an execution of components within the second webpage document.

21. The computer program product of claim 20, wherein the set of instructions are further configured, when executed by the browser on the computerized device, and responsive to a said message comprising predefined data, to perform one or more of:

modifying the display characteristics of the frame within the first webpage document;

providing information about the first webpage by way of a response; and executing scripting instructions contained within the message.

22. The computer program product of claim 19, wherein the set of instructions are further configured, when executed by the browser on the computerized device, to authenticate the second webpage document in response to receiving a message.

23. The computer program product of claim 22, wherein the set of instructions are further configured, when executed by the browser on the computerized device, to provide functionality to the second webpage document in dependence on the second webpage document being authenticated.

* * * * *